United States Patent
Carbo et al.

[15] 3,670,477
[45] June 20, 1972

[54] SLUDGE RETRIEVAL APPARATUS FOR AIR POLLUTION CONTROL SYSTEMS

[72] Inventors: Jerry A. Carbo, Irwin; Dennis F. Grady, Pittsburgh, both of Pa.

[73] Assignee: Westinghouse Air Brake Company, Wilmerding, Pa.

[22] Filed: May 7, 1970

[21] Appl. No.: 35,325

[52] U.S. Cl. ............................55/227, 55/229, 55/242, 210/257, 210/259, 210/265, 210/405
[51] Int. Cl. ....................B01d 46/04, B01d 23/00
[58] Field of Search ..........................55/227, 228, 229, 242; 210/259, 265, 263, 405, 257

[56] References Cited

UNITED STATES PATENTS

| 3,200,949 | 8/1965 | Aulich et al | 210/405 X |
| 3,353,335 | 11/1967 | Caballero | 55/229 X |
| 3,353,799 | 11/1967 | Lions et al. | 55/228 X |
| 1,654,629 | 1/1928 | Baylis | 210/257 |
| 3,528,551 | 9/1970 | Hurubel | 210/257 X |

*Primary Examiner*—S. Leon Bashore
*Assistant Examiner*—Robert Lindsay, Jr.
*Attorney*—Ralph W. McIntire, Jr.

[57] ABSTRACT

Apparatus for removing pollutants from pollutant-laden water discharged from a water type dust collector device, such polluted water being pumped from a collecting tank, where the pollutants are held in solution in the water by a mixer, to a water-using device, such as a foundry sand muller, which does not require pollution-free water and which, by its nature of operation, that is, when the pollutant-laden water is passed through the sand, effects removal of pollutants from the water thus discharging the water in a cleaner state than when it entered the muller.

6 Claims, 1 Drawing Figure

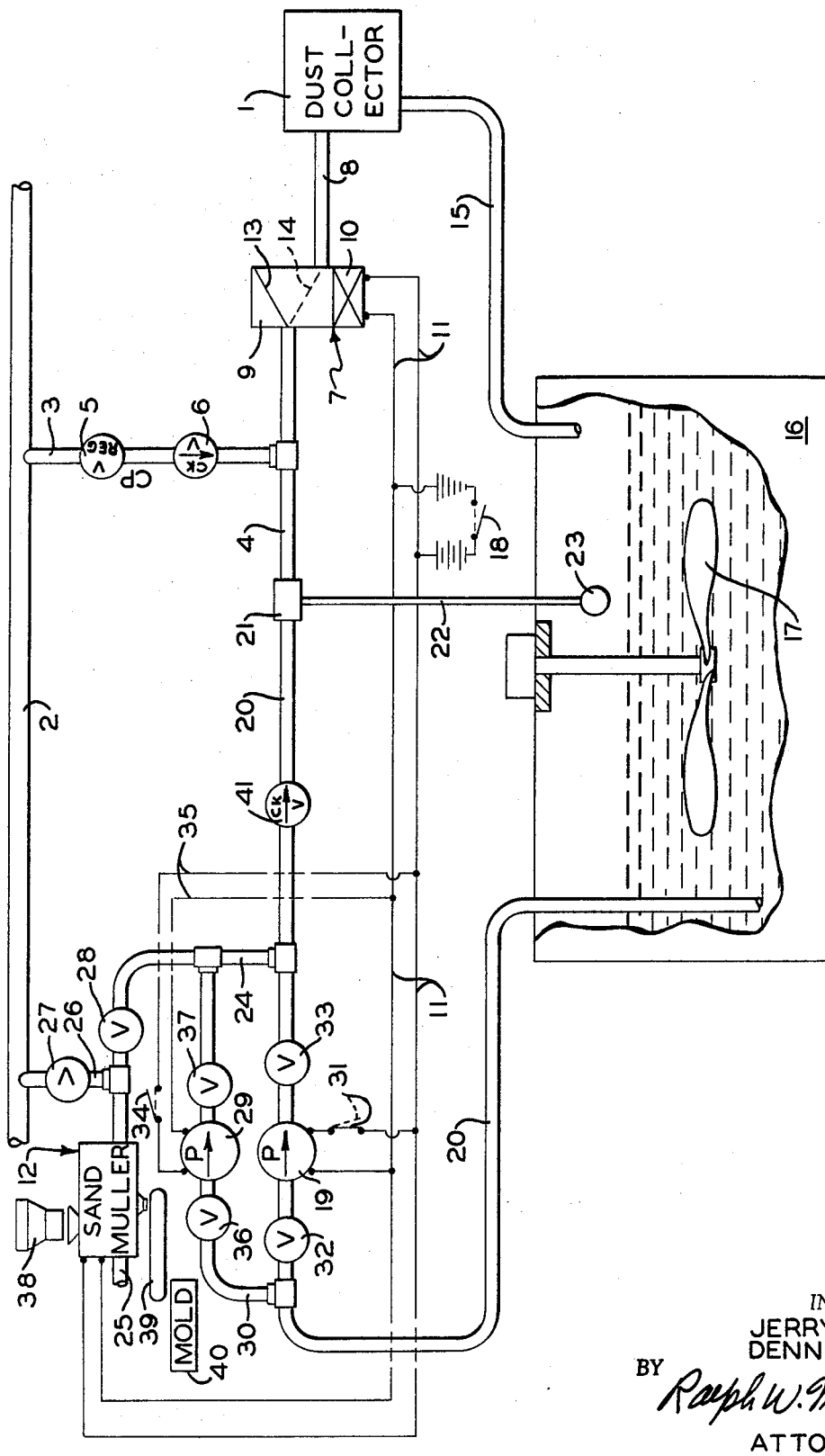

SLUDGE RETRIEVAL APPARATUS FOR AIR POLLUTION CONTROL SYSTEMS

BACKGROUND OF THE INVENTION

In controlling air pollution, as in a foundry for example where sand and other dust particles are prevalent in the air, dust collectors may be used, whereupon the dust particles or other contaminants removed from the air by such dust collectors may be entrained by a medium such as a stream of water injected through nozzles into the dust collector for disposal thereof. Where pollution control measures are in effect, however, the water must be purged of pollutants therein to a degree required by the control measures before it may be discharged into a stream or other places of disposal.

Removal of pollutants from water, in some systems, is accomplished by allowing the polluted water to flow into a settling tank wherein the pollutants precipitate (sometimes with the aid of chemicals) to the bottom of the tank. This process, however, still requires removal and disposal of the sludge formed in the bottom of the tank, an operation that can be very costly.

SUMMARY OF THE INVENTION

The object of the present invention is to provide apparatus for removing and disposing of pollutants from a pollutant-laden medium such as water flowing from a dust removal device used in an air pollution control system before discharging such water into a stream or the like.

The invention comprises a collecting tank into which the pollutant-laden medium or water is accumulated, agitating means disposed in the tank for preventing the pollutants in the medium from precipitating to the bottom of the tank, pump means for pumping the pollutant-laden medium from the tank to a device or apparatus using material possessing filtering qualities (such as a foundry sand muller, for example, wherein pollutant-laden water may be used for mixing sand with water and a binder and, in so doing, filtering pollutants from the water when passing through the sand), and means for actuating the entire apparatus in synchronization with actuation of the conveyor means when the latter is actuated for delivering said material to said device (sand to the muller). A valve arrangement in the tank insures against over-accumulation of the medium therein and provides for recirculation of the medium from the tank to the dust collector when the medium level in the tank attains a preset maximum.

The single FIGURE drawing is a schematic arrangement of sludge retrieval apparatus embodying the invention.

DESCRIPTION AND OPERATION

As shown in the drawing, the apparatus embodying the invention comprises a wet dust collector device indicated symbolically by a block identified by the reference numeral 1. In some suitable manner, such as by a vacuum system (the details of which are not deemed essential to an understanding of the present invention) dust and pollutant-laden air is directed into the dust collector 1 wherein such pollutants are removed from the air by entrainment thereof in a medium such as a stream of water injected into the dust collector, said water being supplied from a clean water source, such as city water supply, shown in the form of a pipe 2. Clean water from pipe 2 flows into and through a branch pipe 3 connecting with a pipe 4, said branch pipe 3 having interposed therein, in serial relation, a pressure regulating valve device 5 adjacent pipe 2 and a one-way check valve device 6 adjacent pipe 4, the direction of flow through said check valve being, as indicated by an arrow, from pipe 2 to pipe 4.

Clean water from pipe 2 flows to the dust collector 1 via pipes 3 and 4, at a pressure determined by the setting of pressure-regulating valve device 5, and via a solenoid actuated valve device 7 interposed between one end of pipe 4 and one end of a pipe 8 leading to the dust collector 1. Valve device 7, which controls communication between pipes 4 and 8, comprises a valve portion 9 and a solenoid portion 10 and is arranged so as to be energized by general electrical control circuit 11 simultaneously with actuation of a conveyor (not shown) used for conveying sand to a sand muller 12, where sand for molding purposes is conditioned with water and a binder in predetermined ratios.

Valve portion 9 of the valve device 7 normally occupies a closed or cut-off position in which communication between pipes 4 and 8 is closed, said closed position being indicated by a solid line 13. Energization of the solenoid portion 10 effects operation of valve portion 9 to an open or supply position, indicated diagrammatically by a broken line 14, for communicating pipe 4 with pipe 8.

Clean water supplied to the dust collector 1, as above set forth, is sprayed into the dust collector by nozzles (not shown) to entrain the dust and other pollutants gathered by the dust collector, and then flows via a pipe 15 to a reservoir or collecting tank 16. An agitator 17 operably disposed in the collecting tank 16 constantly stirs the pollutant-laden water in said tank to thereby maintain the pollutants uniformly distributed in the water rather than allow them to settle to the bottom of the tank.

Actuation of the muller 12 for preparing sand for molding operations is effected when the control circuit 11 connected thereto is energized, such energization occurring simultaneously with actuation of the sand conveyor (not shown) and the solenoid 10 of valve device 7, all of which apparatus are connected to each other via said control circuit including a master switch 18. Energization of electrical circuit 11 also effects operation of a pump 19, which is connected by parallel circuitry to said circuit 11, said pump being interposed in a pipe 20 having one end disposed in the collecting tank 16 and the other end connected to one side of a float valve 21, the other side of said float valve being connected to the end of pipe 4 opposite solenoid valve device 7.

The float valve 21, the purpose of which will be disclosed hereinafter, is normally in a closed position for interrupting communication between pipes 20 and 4, and is operable to an open position, in which said communication is made, by a rod 22 having one end disposed in the collecting tank 16 with a float 23 affixed thereto. The float 23 and rod 22 operate in conventional manner, that is, when the water level in tank 16 attains a predetermined height or maximum level, said float moves the rod upwardly, as viewed in the drawing, to cause valve 21 to be operated to its open position above described.

When pump 19 is actuated, pollutant-laden water is pumped from tank 16 via pipe 20 and a branch pipe 24 leading from said pipe 20 to the sand muller 12. When the pollutant-laden water thus supplied to the muller 12 passes through the sand, during the conditioning process of said sand, the pollutants are removed from the water which may then be recirculated to the dust collector or discharged as waste water via a pipe 25. In either event, the discharged water leaving via pipe 25 is free of pollutants.

Fresh city water, if necessary, may be supplied to the muller 12 via a branch pipe 26 connecting pipe 2 with branch pipe 24. A cut-off valve 27 is interposed in branch pipe 26 for normally cutting off communicating, and therefore water supply, through said branch pipe when not required. A valve 28 is interposed in branch pipe 24 between pipe 20 and the connection of said branch pipe with pipe 26 thus enabling pipe 20 to be cut off from the muller 12 when fresh water from pipe 2 is being used. By re-using available water from collecting tank 16, however, which has already been used in removing pollution from the dust collector 1, an economical water-using system is provided.

As an emergency measure, a pump 29 is interposed in a pipe 30 connecting pipe 20 with pipe 24 in parallel relation to pump 19. In the event that pump 19 should become inoperative, said pump can be isolated by opening a normally closed switch 31 in the parallel circuit connecting said pump to circuit 18 and by closing a pair of valves 32 and 33 interposed in pipe 20 on opposite sides of said pump. In order to activate pump 29, a normally open switch 34 interposed in a branch circuit 35 electrically connecting said pump to circuit 11 in parallel relation to pump 19, is closed and a pair of valves 36 and 37 interposed in pipe 30 on opposite sides of pump 29 are opened. Thus, when pump 29 is operating, water from tank 16 is detoured to the sand muller 12 from pipe 20 to pipe 24 via pipe 30 rather than directly from pipe 20 to pipe 24.

In considering the operation of the apparatus disclosed herein and embodying the invention, it will be assumed that the dust collector 1 operates continually in removing dust and other pollutants from the air and that the level of water in tank 16 is at a level low enough that float valve 21 closed. The remainder of the apparatus remains idle until the operator of the sand muller 12 activates the conveyor and the sand muller to prepare sand for molding operations by closing the master switch 18. It is during the time that the sand muller 12 is in operation that the greatest amount of dust is caused to be deposited in the air, and for this reason, actuation of the sludge retrieval apparatus is synchronized with activation or the sand muller.

Thus, as was above noted, the conveyor carries sand to the sand muller 12, said muller, the solenoid 10 of valve device 7 and the pump 19 are all actuated simultaneously. Valve portion 9 of valve device 7, therefore, is operated to its open position 14 whereby clean water from pipe 2 via pipe 3, regulating valve 5, check valve 6, pipe 4 and pipe 8 is supplied to the dust collector 1 for entraining the dust and other pollutants accumulated therein, such pollutant-laden water then being directed via pipe 15 to collecting tank 16 where the pollutants in the water are kept in solution by the constantly operating agitator 17.

The now-operating pump 19 causes pollutant-laden water to be drawn from tank 16 and supplied to the muller 12, which is provided with sand from the conveyor (not shown) through a hopper 38, such water being used for mixing said sand with a binder in proper proportions for molding use. As a result of this process, the water is cleansed of the pollutants therein, said pollutants being redeposited in the sand as the water is passed therethrough. The cleansed water is thereafter discharged via pipe 25 as waste or recirculated to the dust collector 1, as desired. When the operator terminates operation of the muller 12 by deenergizing circuit 11, operation of pump 19 is also terminated, and solenoid 10 is concurrently deenergized to cause valve portion 9 to operate to its closed position 13. The sand thus conditioned in the muller 12 may be supplied via an endless belt 39 to a mold 40, both of which are indicated symbolically in the drawing.

Notwithstanding periodic operation of the apparatus, as above described, and, therefore, depletion of water in tank 16, such water in said tank, under certain conditions, may accumulate at a rate greater than the rate at which it is withdrawn when used by the muller 12. When the water level in tank 16 reaches the maximum level, above noted, or the level at which float 23 is contacted, valve 21 is operated to an open position. With valve 21 open, subsequent actuation of the apparatus, and therefore pump 19, causes water withdrawn from tank 16 not only to be supplied to the muller 12, but to also be pumped through pipe 20, through the now-open valve 21, through pipe 4, through the energized and open valve device 7, and through pipe 8 to the dust collector. A check valve 41 is interposed in pipe 20, between float valve device 21 and the junction of pipe 20 with pipe 24 to allow flow in the direction indicated by the arrow and to check flow in the opposite direction. The setting of pressure regulating valve 5 is such that water from the supply pipe 2 is delivered through the check valve 6 at a pressure less than that established by the pump 19 (or pump 29) in pipe 20, so that when the float valve 21 is open, as above described, water from pipe 2 is prevented by the pressure differential on opposite sides of the check valve device 6 from flowing therepast.

Circulation of contaminated water from the settling tank 16 to the dust collector 1, when the water level in said tank attains maximum level to open valve 21, does not create a seriously detrimental situation, because the solution in the settling tank at such time is relatively unpolluted due to previous circulation of fresh water from pipe 2 and due to relative inactivity or idleness of the muller, the latter actually being the main reason for the rising of the water level in the tank 16. But such idleness or reduced activity of the muller 12 also results in reduced dust pollution in the air and consequent reduced pollution of the water flowing into tank 16.

We claim:

1. Apparatus for use in an air pollution control system for purging a pollutant-laden medium of pollutants therein prior to disposal of such medium, said apparatus comprising the combination of:
   a. a dust collector for removing pollutants from the surrounding atmosphere and through which a medium for entraining the pollutants accumulated therein is circulated;
   b. a reservoir for receiving the pollutant-laden medium from the dust collector;
   c. agitator means operably disposed in said reservoir for maintaining the pollutants in a suspended state in the medium;
   d. sand muller filtering means;
   e. first conduit means connecting said reservoir with said filtering means;
   f. a primary pump interposed in said first conduit means for transferring said pollutant-laden medium from said reservoir to said filtering means for purging the medium of the pollutants therein; and
   g. second conduit means via which the purged medium is carried away.

2. Apparatus, as defined in claim 1, further characterized by:
   a. water supply means for providing said medium for entraining the pollutants accumulated in the dust collector;
   b. third conduit means via which clean water may be supplied from said water supply means to said dust collector; and
   c. fourth conduit means for carrying pollutant-laden water from said dust collector to said reservoir.

3. Apparatus, as defined in claim 2, further characterized by:
   a. control means operable when energized and deenergized for activating and deactivating, respectively, said primary pump; and
   b. valve means interposed in said third conduit means between said water supply means and said dust collector, said valve means being operable responsively to energization of the control means, to a supply position in which clean water is supplied to the dust collector, and being operable responsively to deenergization of the control means, to a cut-off position in which supply of clean water to the dust collector is cut off.

4. Apparatus, as defined in claim 3, further characterized by:
   a. fifth conduit means having one end connected to said first conduit means at a point between said pump and said filtering means and the other end connected to said third conduit means at a point between said source of clean water and said valve means; and
   b. a float valve device interposed in said fifth conduit means and including an operating float member disposed within said reservoir at a certain level, said float member being effective, as long as the water level in said tank is below said certain level, for maintaining said float valve device in a closed position in which communication through said fifth conduit means is closed, and when the water level in said reservoir reaches said certain level, for operating said float valve device to an open position for opening communication through said fifth conduit means via which excessive water accumulation in said reservoir is recirculated to the dust collector upon actuation of said pump and operation of said valve means to its said supply position.

5. Apparatus, as defined in claim 4, further characterized by means interposed in said third conduit means for preventing flow of clean water from said water supply means during such time that communication through said fifth conduit means is open.

6. Apparatus, as defined in claim 1, further characterized by a secondary pump interposed in said first conduit means in parallel relation to said primary pump, and means for operatively isolating either one of said primary and secondary pumps and operatively activating the other.

* * * * *